US012524410B2

(12) United States Patent
Teflioudi et al.

(10) Patent No.: US 12,524,410 B2
(45) Date of Patent: Jan. 13, 2026

(54) HANDLING EARLY EXIT IN A PIPELINED QUERY EXECUTION ENGINE VIA BACKWARD PROPAGATION OF EARLY EXIT INFORMATION

(71) Applicant: SAP SE, Walldorf (DE)

(72) Inventors: Christina Teflioudi, Heidelberg (DE); Paul Willems, Heidelberg (DE); Till Merker, Sandhausen (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/317,852

(22) Filed: May 15, 2023

(65) Prior Publication Data

US 2024/0386017 A1 Nov. 21, 2024

(51) Int. Cl.
*G06F 16/2455* (2019.01)
*G06F 16/2453* (2019.01)

(52) U.S. Cl.
CPC .. *G06F 16/24553* (2019.01); *G06F 16/24542* (2019.01)

(58) Field of Classification Search
CPC ............ G06F 16/24553; G06F 16/24542
See application file for complete search history.

(56) References Cited

U.S. PATENT DOCUMENTS

| | | | |
|---|---|---|---|
| 7,984,043 B1* | 7/2011 | Waas | G06F 16/8358 |
| | | | 707/718 |
| 2006/0212429 A1* | 9/2006 | Bruno | G06F 16/24578 |
| 2014/0280035 A1* | 9/2014 | Fraser | G06F 16/24542 |
| | | | 707/718 |
| 2014/0281748 A1* | 9/2014 | Ercegovac | G06F 11/0727 |
| | | | 714/49 |
| 2019/0220535 A1* | 7/2019 | Lee | G06F 16/283 |
| 2020/0286146 A1* | 9/2020 | Song | G06F 16/9024 |
| 2021/0073226 A1* | 3/2021 | Chavan | G06F 16/24532 |
| 2021/0248143 A1* | 8/2021 | Khillar | G06F 16/2379 |
| 2021/0271676 A1* | 9/2021 | Horn | G06F 16/24556 |

* cited by examiner

*Primary Examiner* — Courtney Harmon
(74) *Attorney, Agent, or Firm* — Mintz Levin Cohn Ferris Glovsky and Popeo, P.C.

(57) ABSTRACT

In some implementations, there is provided receiving a query request including a top k query operator for query plan generation, optimization, and execution; generating a query plan that includes at least one pipeline of a plurality of operators, wherein the at least one pipeline is associated with a directed acyclic graph; detecting in the query plan a first operator in the at least one pipeline that causes an early exit; and in response to the early exit by the first operator during query execution, processing back through the directed acyclic graph to identify at least one preceding operator that should or should not run given the early exit of the first operator.

17 Claims, 7 Drawing Sheets

```
Receiving a query request including a top k query operator for query plan generation,
optimization, and execution 352

Generating a query plan that includes at least one pipeline of a plurality of operators, wherein
the at least one pipeline is associated with a directed acyclic graph 354

Detecting in the query plan a first operator in the at least one pipeline that causes an
early exit 356

In response to the early exit by the first operator during query execution, processing back
through the directed acyclic graph to identify at least one preceding operator that should or
should not run given the early exit of the first operator, wherein the identifying whether the at
least one preceding operator should or should not run is based on a state of one or more
operators coupled to one or more outgoing links of the at least one preceding operator and a
propagation mode assigned to the at least one preceding operator 358
```

Receiving a query request including a top k query operator for query plan generation, optimization, and execution 352

Generating a query plan that includes at least one pipeline of a plurality of operators, wherein the at least one pipeline is associated with a directed acyclic graph 354

Detecting in the query plan a first operator in the at least one pipeline that causes an early exit 356

In response to the early exit by the first operator during query execution, processing back through the directed acyclic graph to identify at least one preceding operator that should or should not run given the early exit of the first operator, wherein the identifying whether the at least one preceding operator should or should not run is based on a state of one or more operators coupled to one or more outgoing links of the at least one preceding operator and a propagation mode assigned to the at least one preceding operator 358

HANDLING EARLY EXIT IN A PIPELINED QUERY EXECUTION ENGINE VIA BACKWARD PROPAGATION OF EARLY EXIT INFORMATION

TECHNICAL FIELD

The subject matter described herein relates generally to database processing and more specifically to database query optimization.

BACKGROUND

A database may be configured to store an organized collection of data. For example, data held in a relational database may be organized in accordance with a schema defining one or more relations, each of which being a set of tuples sharing one or more common attributes. The tuples of a relation may occupy the rows of a database table while the columns of the database table may store the values of the common attributes shared by the tuples. Moreover, one or more attributes may serve as keys that establish and identify relationships between the relations occupying different database tables. The database may support a variety of database operations for accessing the data stored in the database. For instance, the database may support transactional processing (e.g., on-line transactional processing (OLTP)) that modifies the data stored in the database. Alternatively and/or additionally, the database may support analytical processing (e.g., on-line analytical processing (OLAP)) that evaluates the data stored in the database.

SUMMARY

Systems, methods, and articles of manufacture, including computer program products, are provided for handling early exits. In some implementations, there is provided a system including at least one data processor; and at least one memory storing instructions which, when executed by the at least one data processor, cause operations comprising: receiving a query request including a top k query operator for query plan generation, optimization, and execution; generating a query plan that includes at least one pipeline of a plurality of operators, wherein the at least one pipeline is associated with a directed acyclic graph; detecting in the query plan a first operator in the at least one pipeline that causes an early exit; and in response to the early exit by the first operator during query execution, processing back through the directed acyclic graph to identify at least one preceding operator that should or should not run given the early exit of the first operator, wherein the identifying whether the at least one preceding operator should or should not run is based on a state of one or more operators coupled to one or more outgoing links of the at least one preceding operator and a propagation mode assigned to the at least one preceding operator.

In some variations, one or more features disclosed herein including one or more of the following features may be implemented as well. The query request may be received at a database execution engine. The top k query operator may limit query results to a value of k query results. The generating further may further include generating the directed acyclic graph, wherein the directed acyclic graph includes the at least one pipeline of the plurality of operators. The first operator may include a limit operator associated with the top k query, wherein the limit operator stops, during query execution of the first operator, processing and performs the early exit in response to k query results being returned from one or more databases. The generating and the detecting may occur during query plan generation for the query request including the top k query operator. The processing back occurs during the query execution of the query plan. In response to the early exit by the limit operator, stopping processing of the at least one preceding operator based on the state of one or more operators coupled to the one or more outgoing links of the at least one preceding operator and the propagation mode assigned to the at least one preceding operator.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to the allocation of worker threads to resume execution of a query execution plan, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

An in-memory relational database may utilize main memory for the primary storage of database tables. For example, the in-memory relational database may be implemented as a column-oriented database (or a columnar database) that stores data from database tables by columns instead of by rows. In the case of the in-memory column-oriented relational database for example, each tuple of a relation may correspond to a record occupying one row of a database table while the columns of the database table may store the values of the common attributes shared by multiple tuples, such that the values occupying each column of the database table (which may span multiple rows (or records) of the database table) may be stored sequentially in one or more data pages, with each data page storing at least a portion of a column. The in-memory column-oriented relational database may support efficient data compression and partitioning for massively parallel processing. Because the in-memory database is directly accessible by the central processing unit (CPU) of the computing engine, transactions accessing the in-memory database may be executed to provide near-instantaneous results.

The throughput and storage capacity of a database, such as an in-memory column-oriented relational database as well as other types of databases, may be maximized by distributing the processing and storage of data across multiple computing nodes. A single database table may therefore be divided into multiple partitions (or internal tables), for example, through one or more of hash partitioning, round-robin partitioning, and range partitioning, and stored across multiple computing nodes. Doing so may maximize opportunities for parallelization in which a single query is divided into multiple tasks and assigned to individual worker threads for parallel execution. As used herein, the term "worker thread" refers to a thread or thread of execution, which is a sequence of instructions managed independently by a scheduler. Individual worker threads (e.g., the corresponding sequences of instructions) may be scheduled for sequential execution and/or parallel execution by one or multiple central processing units (CPUs).

In a parallelization framework, a database execution engine (which may also be referred to as a query execution engine or an execution engine, for short) may divide a query accessing a dataset (e.g., one or more database tables) into a quantity of tasks determined based on the quantity of time required to execute the query on a portion of the dataset. As such, if a large quantity of time is required to execute the query on the portion of the dataset, the database execution engine may determine that the query is computationally intensive and thus divide the query into a larger quantity of smaller tasks. Meanwhile, the quantity of worker threads allocated to execute the query may be determined based on the progress of the query observed at various time intervals. For instance, upon allocating an initial quantity of worker threads to perform the tasks associated with the query, the database execution engine may monitor the progress of the query (e.g., the quantity of tasks that have not been performed by any worker threads, the quantity of tasks that have been performed relative to the total quantity of outstanding tasks, and/or the like) to determine whether to increase that initial quantity of worker threads.

Moreover, the database execution engine may also use pipelining. In the case of pipelining, the database execution engine breaks up data into smaller chunks of data, such that each smaller chunk of data can be processed by a series of one or more operators. The operators refer to low-level operators, such as code that performs a specific operation during operator execution, rather than a high-level relational algebra operator. For example, the low-level operator may implement a lock on a database table, perform an index scan, perform a table scan at a given database, perform a limit operation (e.g., LimitOp), and/or the like. During query plan generation and optimization, these low-level operators may be connected with each other to form a graph, such as a directed acyclic graph (DAG). Operators with no outgoing links may split the DAG up into multiple pipelines. For example, a pipeline ends on an operator with no outgoing links and starts with an operator after the previous pipeline ended. Pipeline execution may be performed in a recurrent fashion, such that operator "n" of the pipeline takes a chunk of data as input, performs its operation ("n") on the input data, and then the operator "n" pushes its corresponding output to the next operator "n+1". After the last operator in the pipeline is done performing its operation, control is returned to a prior operator. For example, when operator n+1 is finished, execution control may return to a prior operator n. The operator n may (or may not) continue processing (for example, producing another piece of data and pushing it down the pipeline of operators, performing a cleanup task, freeing resources, and/or the like). In other words, the pipeline represents a set of data processing elements (e.g., operators) connected in series, such that the output of one element of the pipeline is the input of the next element of the pipeline, and buffer storage may be used between the elements. In some instances, the operators of a pipeline can be executed in parallel or in time-sliced fashion.

In some implementations, a database execution engine may receive a query request that includes a "top k query" request. The top k query refers to a query that requests only a quantity "k" of the top results (e.g., query responses). For example, a top k query may retrieve only k (where k is greater than or equal to 1) query results from a data set of a database management system (or database, for short). For example, a "Select Top 10 Customer Id from Sales.Data.Table Orderby OrderDate Desc" would return, as a query result, the 10 most recent customers (which are identified by their Customer ID) to place an order. Without the top k, the query result would include all of the customer IDs sorted by Order Date.

In the case of a top k query, a "LimitOp" operator in a pipeline may be used to count the incoming query results (e.g., count the quantity of returned results, count the quantity of rows in the result, etc.), and as long as the limit k is not exceeded, the LimitOp pushes the query results to the next operator in the pipeline. If the limit k is reached however, the LimitOp stops pushing the data to the next operator in the pipeline.

In the case of a pipeline of operators where one or more operators precede the LimitOp, these preceding operators may have no way of knowing that the limit k at the LimitOp has been reached and, as such, some of the preceding operators might not be able to stop processing given the early exit caused by the LimitOp reaching its limit k. Since these preceding operators are unaware of the early exit by the LimitOp, these preceding operators will continue processing the remaining data even though the processing of the remaining data might not be necessary given the LimitOp. A simple example is shown at Table 1 below. In the simple example of Table 1, the LimitOp may detect that the limit of k results have been returned (e.g., k=3 rows of Table A returned by the table scan), but the preceding operators 1 and 2 may continue processing even though the limit k has been reached and no further processing is needed by operators 1 and 2. As such, the operators 1 and 2 may be wasting valuable processing resources and may be producing unnecessary data.

TABLE 1

Example Portion of Pipeline Operators for a top k query
Operator 1: Table A lock
Operator 2: Table A scan
Operator 3: LimitOp k However, determining whether a preceding operator should stop processing given an early exit caused by for example the LimitOp reaching its k limit is not as straightforward as in the simple example of Table 1. Specifically, the preceding operators are part of a pipeline and part of the directed acyclic graph of operators including the LimitOp but the preceding operators may be needed by other operators of the directed acyclic graph, so stopping processing at the preceding operators may cause an error in the query execution. Therefore, there is a need for a process to identify which preceding operators of the directed acyclic graph should be the target of stop operation in the event of an early exit caused by the LimitOp.

Although some of the examples refer to the LimitOp as the early exit operator of the pipeline of the directed acyclic graph, other types of operators may be used as an early exit operator, such as a Distinct operator, a Min aggregation, a Max aggregation, and/or other operators which may provide an early exit at the operator and a corresponding opportunity to prune specific parts of the query plan.

Figure 1A:
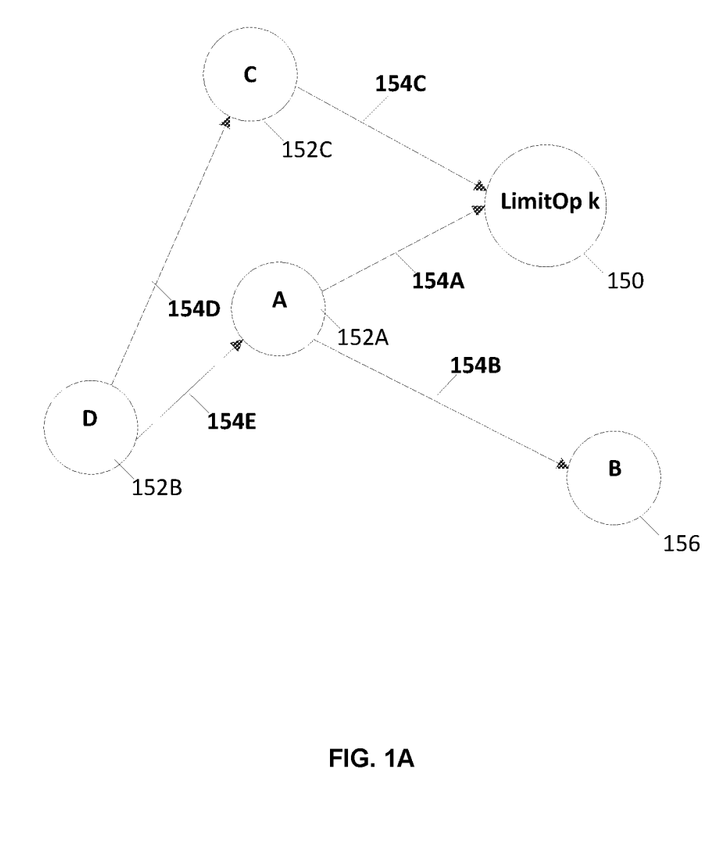
FIGS. 1A-1B depict examples of portions of directed acyclic graphs of operators including pipelines, in accordance with some example implementations.

FIG. 1A illustrates an example of a portion of a directed acyclic graph for a pipeline where the circles correspond to operators 150, 152A-C, and 156, which are connected by links 154A, 154B, 154C, 154D, and 154E. In this example, the LimitOp k 150 reaches its limit of k results, so an early exit is performed at LimitOp k and LimitOp k returns the k results and stops processing. In this example, the LimitOp k is an example of an operator that early exits ("early exit operator) that is able to stop processing.

In the case of preceding operator A 152A for example, the output of operator A is pushed (or shared) via links 154A-B with the LimitOp k 150 and operator B 156. As such, stopping processing of preceding operator A 152A may cause an error in the query execution as operator B may still need operator A to continue processing and thus push data even after the early exit by the LimitOp k 150. Supposing operator A is a table scan operator, so stopping operation of operator A may cause an error as operator B fails to get its input data from the table scan. As noted above, there is a need for a process to identify which operators of the directed acyclic graph should be the target of stop operation in the event of an early exit caused by the LimitOp.

The operators of a pipeline may, as noted, form or represent a directed acyclic graph, and each operator may have one or more outgoing links (which are used to push data) to one or more other operators. Likewise, each operator may have one or more incoming links (which provide data to the operator) from one or more other operators. As noted, FIG. 1A depicts an example of a pipeline including operators 150, 152A-C, and 156, which are connected by links 154A-E.

In some implementations, a database execution engine may monitor one or more operators of a pipeline for an early exit caused by for example a LimitOp associated with a top k query. In response to the early exit, the database execution engine detects the early exit (or the LimitOp notifies the database execution engine of the early exit caused by the limit k being reached). The early exit of the operator may then be propagated back (towards the beginning of the pipeline) to other operators to assess whether these other operators can also stop processing as part of the early exit caused by the LimitOp reaching its limit k. These other operators may include operators preceding the LimitOp in the DAG for the pipeline. In other words, the preceding operators are other operators whose output may reach at least in part the early exit LimitOp.

Referring to the example of FIG. 1A which depicts a pipeline of operators presented in a directed acyclic graph (DAG), when the LimitOp k 150 reaches its limit of k results, the Limit Op k can early exit and stop processing as the LimitOp has its k results for the top k query, for example. In response to the early exit at LimitOp k 150, the database execution engine may detect this early exit at LimitOp k 150 (or the LimitOp k 150 may notify the database execution engine of the early exit caused by the limit k being reached). Next, the database execution engine may propagate backwards the early exit from the LimitOp k 150 operator to other operators, such as the preceding operators 152A-C, to determine whether the other operators may also stop processing. These preceding operators 152A-C may all represent operators whose outputs may at least in part reach the early exit operator, LimitOp k 150.

In some implementations, when the query plan is generated (and, e.g., the directed acyclic graph is generated), the database execution engine (or a query plan optimizer associated with the database execution engine) may keep track of the operators that can possibly reach the early exit operator, such as the LimitOp k 150. In other words, the operators that can possibly reach the early exit operator, such as LimitOp 150 refers to the preceding operators whose output data may, at least in part, be provided to the early exit operator, such as the LimitOp 150.

In the event of an early exit at the LimitOp 150 for example, the database execution engine may decide if a given preceding operator, such as operators 152A-C, should or should not run in the future (e.g., during query execution) due to the early exit event caused by the LimitOp, for example.

In some implementations, the decision regarding whether a given preceding operator should or should not run (in response to an early exit by the LimitOp) may be based on the (1) decision taken for the operators connected to the outgoing links of the given preceding operator and/or (2) a propagation mode assigned to the given preceding operator. The propagation mode of a given operator describes a behavior for the operator in response to the early exit by a downstream operator. Table 2 below lists examples of propagation modes.

Given an early exit by the LimitOp K 150 at FIG. 1A for example, the database execution engine may decide the preceding operator C 152C should or should not run based on (1) the decision taken for the operators connected to the outgoing links of the operator 152C and (2) a propagation mode assigned to the preceding operator 152C. Here, the outgoing link 154C of operator C leads to LimitOp k that is in an early exit state (e.g., stopped processing) and the propagation mode is "all next operators." When the propagation mode is "all next operators", and all of the operators coupled via the outgoing links (which in this example is LimitOp 150 coupled via link 154C) of the given operator (which in this example is operator C 152C) are also flagged as having seen an early exit, then the given operator 152C can be flagged that it should not run again due to the early exit.

Given an early exit by the LimitOp K 150, the database execution engine may decide the preceding operator A 152A should or should not run. Here, the decision taken for the LimitOp 150 connected to the outgoing link 154A is an early exit at the LimitOp 150, but the decision taken for the operator 156 connected to the outgoing link 154B is not an early exit. Because the propagation mode of operator A is "all next operators", operator A should run again (i.e., not be stopped) as all of the operators 150 and 156 coupled via the outgoing links 154A-B have not seen an early exit. However, if the propagation mode of operator A 152A is changed to "any next operator" in the previous example, the operator A 152A should not run again as at least one of the operators 150 coupled via the outgoing link 154A has seen an early exit. And, if the propagation mode of operator A 152A is changed to "never," operator A should run again regardless of whether or not the operators 150 156 have seen an early exit. In this way, the database execution engine can propagate back though the preceding operators which may reach LimitOp 150 to determine whether any of the preceding operators may take advantage of the early exit at LimitOp 150 and stop processing.

Continuing the previous example, the database execution engine may decide the preceding operator D 152B should or should not run given an early exit by the LimitOp K 150. In this example, the preceding operator 152B may have a propagation mode of "never" so the database execution engine flags or determines that the operator D should run again despite the early exit. However, if the preceding operator D 152B has a propagation mode of "any next operator" and operator C 152C is marked for an early exit (so it should not run), the database execution engine determines that preceding node D 152B should run as part of the early exit. And, if the preceding operator 152B has a propagation mode of "all next operators," the database execution engine determines whether the preceding node 152B should or should not run based on whether both operator C 152C and operator A 152A are flagged for an early exit and stop processing. Since in this example, operator A continues processing while operator C stops, the database execution engine determines that the preceding node 152B should continue to run. This example illustrates that the decision to stop the processing of a given operator, such as operator D 152B (which is in response to the early exit of the LimitOp 150), depends on the operators between LimitOp 150 and operator D 152B. In other words, before making a decision to stop processing for a given operator such as operator D 152B, the database execution engine will first make a decision to stop processing for the other operators (e.g., 152A and 152C) in the outgoing links. Moreover, since multiple threads might be running on a given operator at a given time, the information regarding whether the given operator will or will not run again due to an early exit event may be stored centrally, such as using an atomic flag that can be modified or read by multiple threads.

Figure 1B:
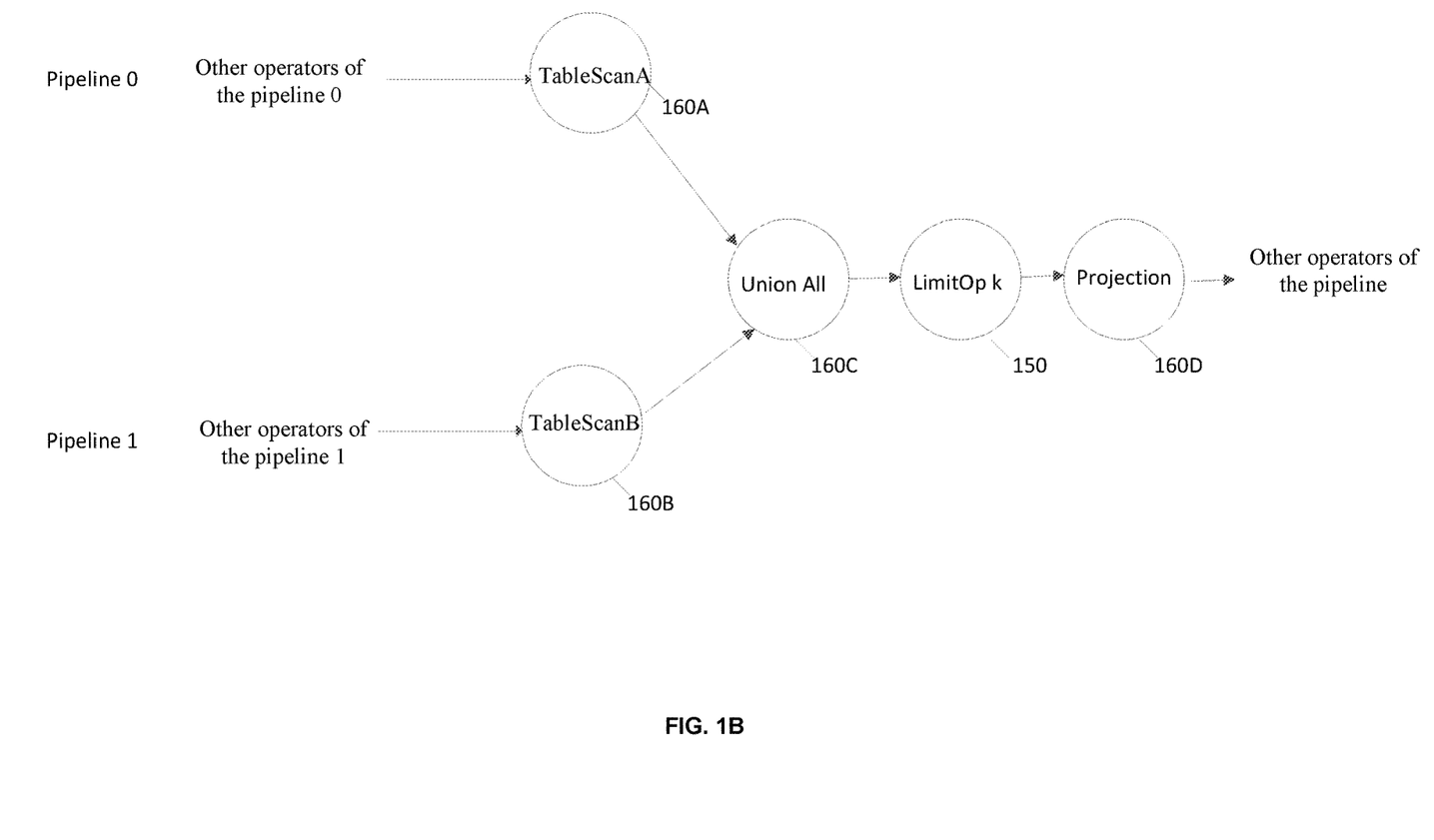

If the LimitOp is reachable by multiple pipelines, the pipelines (which are supposed to run after the early exit happens) may also be pruned by the database execution engine framework based on the same process. Referring to the example of FIG. 1B, there is a first operator 160A of a first pipeline (labeled pipeline 0) and a second operator 160B of a second pipeline (labeled pipeline 1) can reach the LimitOp k 150. In this example, the first pipeline includes the TableScanA 160A, Union All 160C, LimitOp k 150, and Projection 160D, while the second pipeline includes the TableScanB 160B, Union All 160C, LimitOp k 150, and Projection 160D. Assuming that the limit k at LimitOp 150 is reached during the execution of the first operator 160A (TableScanA) in the first pipeline, the early exit information may be propagated backward as disclosed herein to both the first and second pipelines (with the already explained process) to both the beginnings of P0 and P1. As a result, the second operator 160B (TableScanB) and the whole second pipeline (labeled P1) might not have to run at all and can be skipped altogether.

TABLE 2

| Propagation Mode | Description |
| --- | --- |
| All next operators | A given operator of a pipeline should not run again and is flagged by the framework as an operator that has seen an early exit, if all the operators in the given operator's outgoing links are also flagged as having seen an early exit. |
| Any next operator | A given operator should not run again and is flagged by the framework as an operator that has seen an early exit, if at least one of the operators in the given operator's outgoing links is also flagged as having seen an early exit. |
| Never | A given current operator will never be flagged by the framework as an operator that has seen an early exit. |

In some implementations, a given operator of a pipeline may be assigned a propagation mode of "all next operators," "any next operator," and "never." For example, each operator may be assigned a propagation mode during the generation of the query execution plan (also referred to as a query plan). Alternatively, or additionally, when the code of an operator is written, the code may define the propagation mode for the operator based on for example the functionality provided by the operator and/or how the operator should behave given an early exit. As such, the database execution engine (also referred to herein as the framework) can read or determine the corresponding propagation mode assigned to an operator.

Before providing additional description regarding the early exit processing disclosed herein, the following provides description regarding an example database management system in which the early exit processing can be practiced.

Figure 1C:
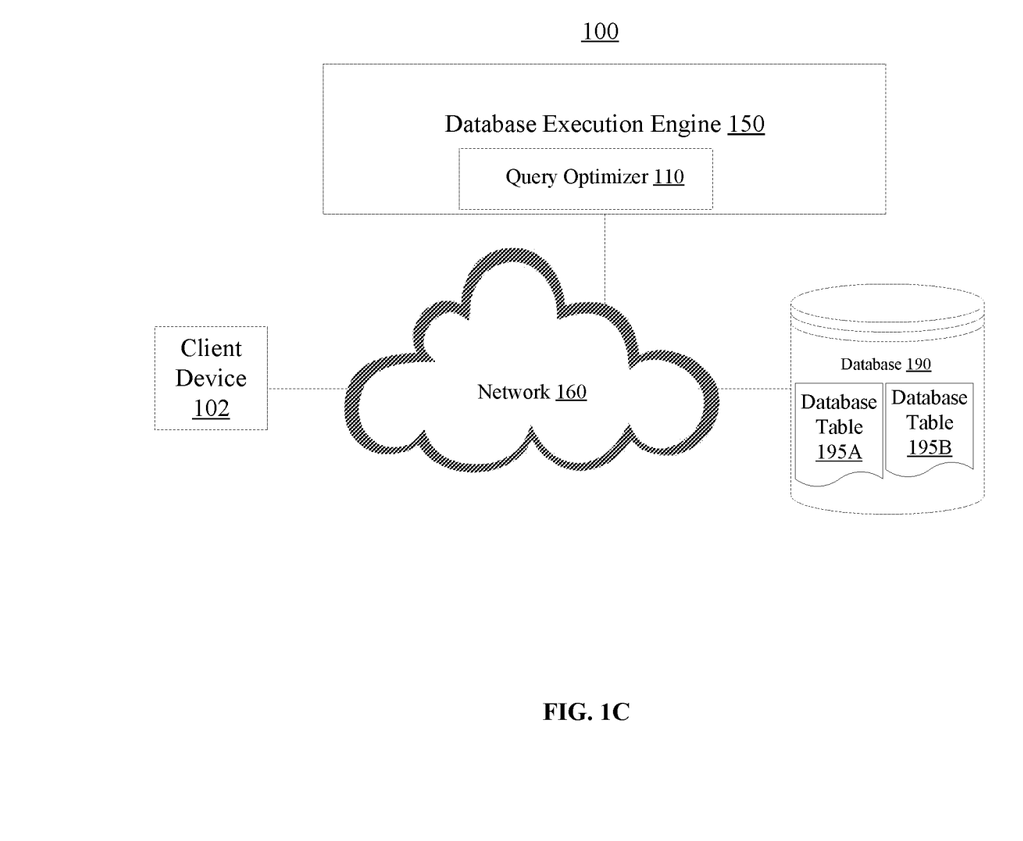
FIGS. 1C and 2 depict examples of a system including a database execution engine including a query optimizer for identifying operators that should not run in response to an early exit, in accordance with some example implementations.

FIG. 1C depicts a system diagram illustrating an example of a system 100, in accordance with some example implementations. Referring to FIG. 1C, the system 100 may include one or more client devices such as client device 102, a database execution engine 1500, and one or more databases, such as database 190. As shown in FIG. 1C, the one or more client devices 102, the database execution engine 1500, and the one or more databases 190 (which may include one or more database tables 195A-B) may be communicative coupled via a network 160. The database execution engine 1500 may include query optimizer 110 that may be used to determine whether a given preceding operator should or should not run when there is an early exit caused by a LimitOp, in accordance with some implementations.

The one or more databases 190 may include a variety of relational database technologies including, for example, an in-memory database, a column-based database, a row-based database, hybrid database (e.g., combination of column and row based), and/or the like. The one or more client devices 102 may include processor-based devices including, for example, a mobile device, a wearable apparatus, a personal computer, a workstation, an Internet-of-Things (IoT) appliance, and/or the like. The network 140 may be a wired network and/or wireless network including, for example, a public land mobile network (PLMN), a local area network (LAN), a virtual local area network (VLAN), a wide area network (WAN), the Internet, and/or the like.

Figure 2:
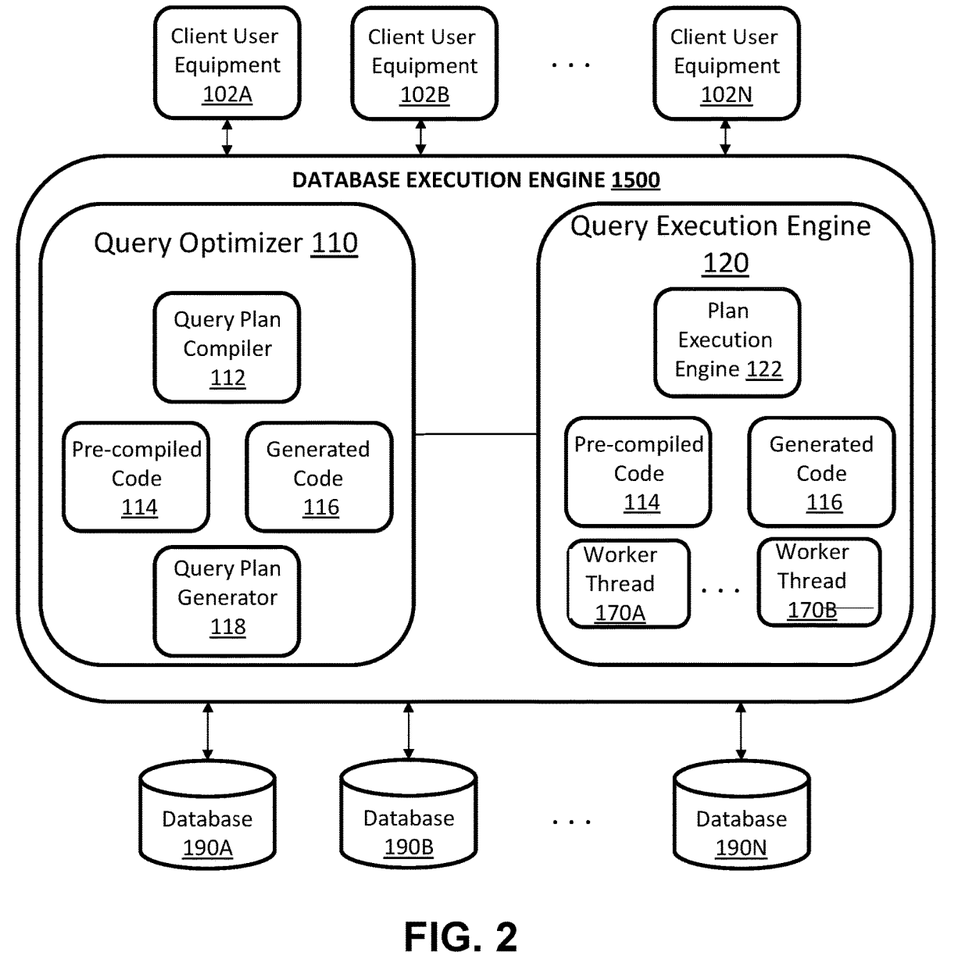

FIG. 2 depicts a block diagram illustrating an example implementation of the database execution engine 1500, in accordance with some example implementations. As shown in FIG. 2, the one or more databases 190 (which may include a first database 190A, a second database 190B, and a third database 190C) may represent a database layer of a database management system (DBMS) where data may be persisted and/or stored in a structured way, and where the data may be queried or operated on using operations such as SQL commands or other types of commands/instructions to provide reads, writes, and/or perform other operations. To illustrate by way of an example, the one or more client devices 102 (which may include the client devices (e.g., client user equipment) 102A-N) may send a query via the database execution engine 1500 to the database layer including the one or more databases 190, which may represent a persistence and/or storage layer where database tables may be stored and/or queried. The query may be sent via a connection, such as a wired connection and/or wireless connection (e.g., the Internet, cellular links, Wi-Fi links, and/or the like) provided, for example, by the network 160.

The database execution engine 1500 may include a query optimizer 110, such as an SQL optimizer and/or another type of optimizer, to receive at least one query from the one or more client devices 102 and generate a corresponding query plan (which may be optimized) for execution by a query execution engine 120. The query optimizer 110 may receive a request, such as a query, and then form or propose an optimized query plan. The query plan (which may be optimized) may be represented as a so-called "query algebra" or "relational algebra" and may be in the form of a directed acyclic graph. The query plan may propose an optimum query plan with respect to, for example, the execution time of the overall query. To optimize a query, the query plan optimizer 110 may obtain one or more costs for the different ways the execution of the query plan may be performed, and the costs may be in terms of execution time at, for example, the one or more databases 190.

A query plan compiler 112 may enable compilation of at least a portion of the query plan. The query plan compiler 112 may compile the optimized query algebra into operations, such as program code and/or any other type of command, operation, object, or instruction. This code may include pre-compiled code 114 (which may be pre-compiled and stored and then selected for certain operations in the query plan) and/or generated code 116 generated specifically for execution of the query plan. For example, the query plan compiler 112 may select pre-compiled code 114 for a given operation as part of the optimization of the query plan, while for another operation in the query plan the query plan compiler 112 may allow a compiler to generate the code (i.e., generated code 116). The pre-compiled code 114 and the generated code 116 represent code for executing the query plan, and this code may be provided to a query plan generator 118, which interfaces with the query execution engine 120.

The query optimizer 110 may optimize the query plan (which may include the noted pipelines of operators) by compiling and generating code. Furthermore, the query optimizer may generate a DAG including operators which may be configured into one or more pipelines. Moreover, the query optimizer 110 may optimize the query plan to enable pipelining during execution. The query execution engine 120 may receive, from the query plan generator 118, compiled code to enable execution of the optimized query plan, although the query execution engine 120 may also receive code or other commands directly from a higher-level application or another source such as the one or more client devices 102. The pre-compiled code 114 and/or the generated code 116 may be provided to a plan execution engine 122 of the query execution engine 120. The plan execution engine 122 may then prepare the plan for execution, and this query plan may include the pre-compiled code 114 and/or the generated code 116. When the code for the query plan is ready for execution during runtime, the query execution engine 120 may step through the code, performing some of the operations within the database execution engine 1500 and sending some of the operations (or commands in support of an operation, such as a read, write, and/or the like) for execution at one or more of one or more database 190A-N.

The query execution engine 120 may, as noted, be configured to handle different types of databases and the corresponding persistent layers and/or tables therein. For example, the one or more databases 190 may include at least one row-oriented database, in which case an insert is performed by adding a row with a corresponding row identifier. Alternatively and/or additionally, where the one or more databases 190A-N include one or more column store databases, which may use dictionaries and compressive techniques when inserting data into a table. Where the database layer includes multiple different types of databases, the query execution engine 120 may perform execution related to handling the differences between different types of databases such as row-oriented databases and column store databases. This may enable a reduction in processing at the database layer, for example, at each of the one or more databases 190A-N. Moreover, the query execution engine 120 may perform other operations including rule-based operations, such as joins and projections, as well as filtering, group by, multidimensional analysis, and/or the like to reduce the processing burden on the database layer. In this way, the query execution engine 120 may execute these and other complex operations, while the one or more databases 190A-N can perform simpler operations to reduce the processing burden at the one or more databases 190A-N.

The query execution engine 120 may run, as noted above, the generated code 116 generated for some query operations, while the pre-compiled code 114 may be run for other operations. Moreover, the query execution engine 120 may combine the generated code 116 with the pre-compiled code 114 to further optimize execution of query related operations. In addition, the query execution engine 120 may provide for a plan execution framework that is able to handle data chunk(s), pipelining, and state management during query execution. Furthermore, the query execution engine 120 may provide the ability to access table storage via an abstract interface to a table adapter, which may reduce dependencies on specific types of storage/persistence layers (which may enable use with different types of storage/persistence layers).

The database layer may provide distributed data storage in which the processing and storage of data is distributed across multiple nodes including, for example, the first database 190A, the second database 190B, the third database 190C, and/or the like. Accordingly, to store a database table 195 at the one or more databases 190, the database execution engine 1500 may divide the database table 195 into multiple partitions by applying one or more of a hash partitioning, round robin partitioning, and range partitioning.

Figure 3A:
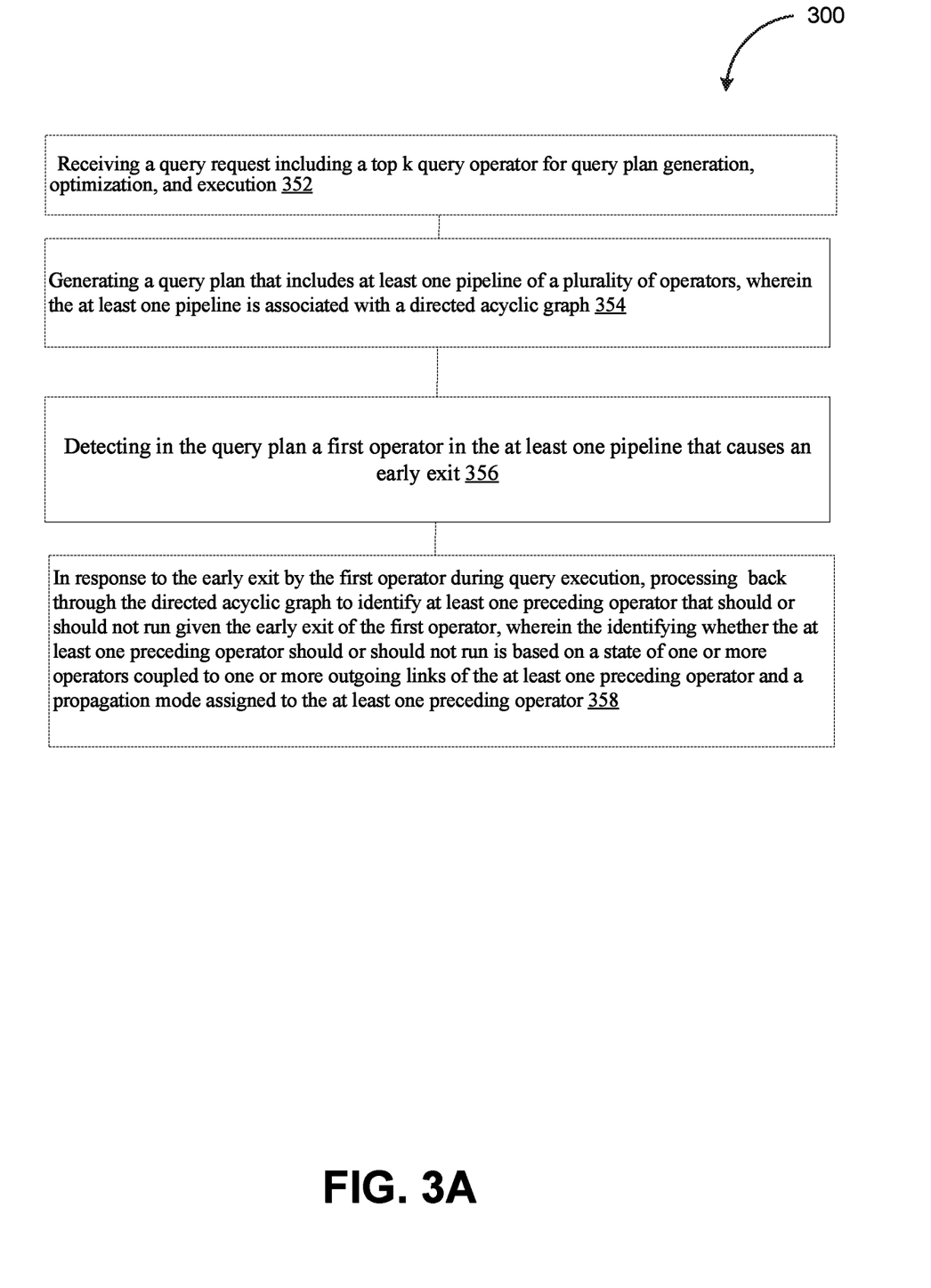
FIG. 3A depicts an example of a flow chart for determining if any operators of a pipeline should be stopped in response to an early exit caused by for example a LimitOp, in accordance with some example implementations.

FIG. 3A depicts a flowchart illustrating an example of a process 300 for determining if any additional operators of a pipeline can be stopped in response to an early exit caused by for example a LimitOp, in accordance with some example implementations.

At 352, a query request including a top k query may be received by the database execution engine. For example, the database execution engine 1500 may receive a query that includes a top k query operator rom a client device, such as client device 102A. For example, the query request may include: Select Top 1*from t. In this example, the query request is received in order to allow the database execution engine 1500 to generate, optimize, and/or execute a query plan for the Select Top 1*from t. In this example, the "Top 1" represents a top k query operator as the query results will be limited to the top k (which in this example is "1") results from table "t".

At 354, a query plan may be generated that includes at least one pipeline of a plurality of operators, wherein the at least one pipeline of operators is associated with a directed acyclic graph (DAG). For example, the database execution engine 1500 may generate a query plan for the query request. The query plan provides instructions that a database needs to follow in order to execute the query on data at the database. For example, the query plan may include one or more pipelines of operators, and the query plan as well as the pipeline(s) may be represented by a directed acyclic graph, an example of which is depicted at FIG. 1A. The directed acyclic graph may also be generated by the database execution engine 1500 (and/or the query optimizer 110).

At 356, a first operator in the at least one pipeline may be detected in the query plan as an early exit operator. For example, the database execution engine 1500 may detect that the query plan's pipeline includes a LimitOp k 150, which may cause an early exit during query execution. To illustrate further, the top k query noted above may result in a low level operator, such as a LimitOp k to be generated and included as part of the query plan. During query plan generation for example, the database execution engine indicates (or identifies) that the LimitOp k 150 might cause an early exit during query plan execution. When the LimitOp k 150 is detected in the query plan, the database execution engine looks into the query plan and collects (and/or identifies) one or more other operators (e.g., preceding operators) that might also be affected by the early exit and thus need to be informed about the early exit to assess whether an early exit is appropriate for these other operators. Once the identity of the early exit operator, such as the LimitOp and the one or more other operators are collected (e.g., identified), during query plan execution time when or if the limit k is reached by the LimitOp for example, the noted backward propagation process takes place and the collected operators are flagged to indicate whether they should or should not run (e.g., based on (1) a state of one or more operators coupled to one or more outgoing links of the at least one preceding operator and (2) a propagation mode assigned to the at least one preceding operator).

In response the early exit by the first operator during query execution, the database execution engine processes back, at 358, through the directed acyclic graph to identify whether there is at least one preceding operator that should or should not run given the early exit of the first operator. The identifying of whether the at least one preceding operator should or should not run is based on a state of one or more operators coupled to one or more outgoing links of the at least one preceding operator and a propagation mode assigned to the at least one preceding operator. During query execution time for example, the database execution engine 1500 propagates back from the first operator that causes the early exit (which in this example is LimitOp 150) to one or more preceding operators, such as operators 152C and 152A both of which have outputs that can reach the LimitOp. As noted, these preceding operators 152C and 152A are collected or identified at 356 (e.g., at query plan generation) but could not be flagged with an indication of should or should not run until query execution time. The processing may iteratively process each operator that may provide an output that can reach the LimitOp, so the processing may traverse back all the way back to the operator 152B, for example.

To assess whether the at least one preceding operator should or should not run, the database execution engine 1500 may determine whether the at least one preceding operator should not run based on (1) a state of one or more operators coupled to one or more outgoing links of the at least one preceding operator and (2) a propagation mode assigned to the at least one preceding operator. In some implementations, the database execution engine 1500 may identify (e.g., indicate, flag, etc.) the at least one preceding operator should or should not run based on a state of operators coupled to one or more outgoing links of the at least one operator and a propagation mode assigned to the at least one preceding operator. This flagging (e.g., identifying) may, as noted, occur during query execution time as the (1) state of the operators is not known until query execution. Referring to the example above at FIG. 1A for example, the database execution engine (and/or the query optimizer 110) may flag (e.g., indicate) that the preceding operator C 152C should not run based on (1) a state of the operators connected to the outgoing links of the operator 152C (which in this example is LimitOp 150 which is flagged as an early exit operator) and the propagation mode assigned to the preceding operator 152C. And, if the propagation mode is "all next operators" or "any next operator", the preceding operator 152C is flagged as should not run. However, if the propagation mode is "never", the preceding operator 152C is flagged as should run. The database execution engine (and/or the query optimizer 110) may process the remaining preceding operators 152A, 152B, so forth of the pipeline to determine whether the given preceding operator should not run based on (1) a state of one or more operators coupled to one or more outgoing links of the given preceding operator and (2) a propagation mode assigned to the given preceding operator.

Once identified (e.g., flagged) as an operator that should not run for example, the at least one preceding operator does not run (e.g., processing by the operator stops) during query execution in response to the first operator having the early exit. For example, the preceding operator C 152C may be flagged to indicate it should not run during query execution given the early exit by the LimitOp 150. In this way, the early exit of the LimitOp is used to prune and/or optimize query execution and stop processing at the flagged or indicated preceding operators that should not run given the early exit of LimitOp 150, so in this example, the preceding operator C 152C may be stopped and also early exit.

Figure 3B:
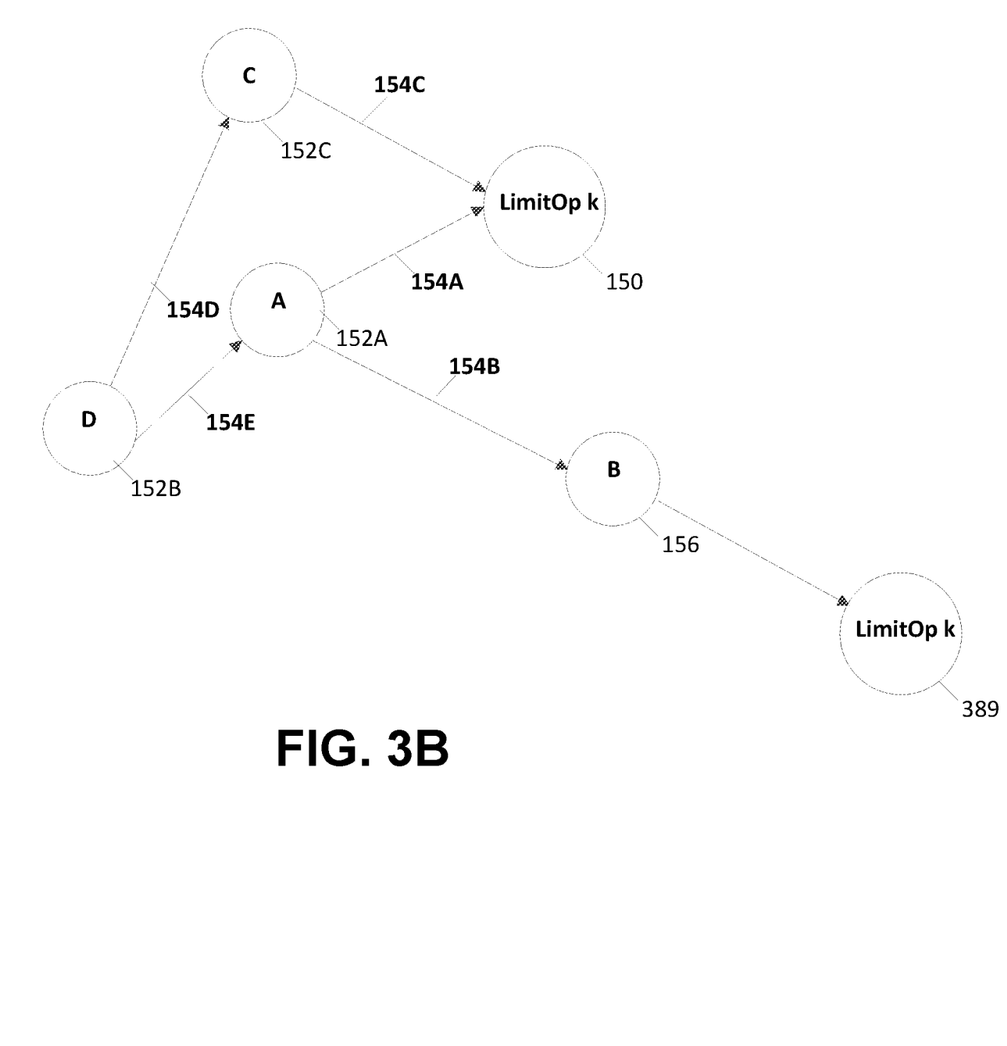
FIG. 3B depict another example of a portion of a directed acyclic graph of operators including pipelines, in accordance with some example implementations.

In some implementations, the process of propagating backwards from the early exit and deciding if an operator should or should not run occurs as noted during query plan execution, rather during the generation of the query plan. Query plan generation refers to a time or phase when the query plan is generated for a query request, while query plan execution refers to executing the operations of the query plan to perform the query. Referring to FIG. 3B for example (which modifies FIG. 1A to include an additional LimitOp x 389 connected to operator B 156), when the LimitOp k 150 reaches the limit k (and early exits) during query execution, operator A 152A with mode "all next operators" might not be able to be flagged as "should not run" at that point in time during query execution. But later in the query execution, LimitOp x 389 may early exit during query execution, so in this example the later early exit of LimitOp x 389 may allow operators A and B to be flagged as should not run. This example illustrates that the decision regarding whether an operator should or should not run cannot be performed until the runtime or query execution time of the operators of the query.

By way of another example, during query execution, the limit operator, such as Limit Op k 150, may be executed. If during query execution, a threshold amount (which in this example is "k") of query results are returned from for example database 190A, B, etc., the database execution engine may prune the execution and allow the Limit Op to stop processing and thus early exit. In response to the early exit during query execution by the Limit Op, the database execution engine may look to see if there are other preceding operators that should not run. In this example, at least preceding operator 152C may be stopped as well (and thus allowed to early exit). The database execution engine may thus stop other preceding operators, which have been flagged or identified at 358 as should not run operators and thus improve query execution by stopping execution of preceding operators which are not needed for execution of the query plan.

By way of another example, during query execution, the limit operator, such as Limit Op k 150, may be executed. If during query execution, a threshold amount (which in this example is "k") of query results are returned from for example database 190A, B, etc., the database execution engine may prune the execution and allow the Limit Op to stop processing and thus early exit. In response to the early exit during query execution by the Limit Op, the database execution engine may look to see if there are other preceding operators which have been indicated preceding operators that should not run which as noted may be stopped as well. But other preceding operators, such as operator A 152 (which is flagged as should run given an early exit by LimitOp 150, for example) may continue to run during query execution after the early exit by LimitOp 150 and preceding operator 152C. Thus, the database execution engine may allow some preceding operators to continue operating.

Figure 4:
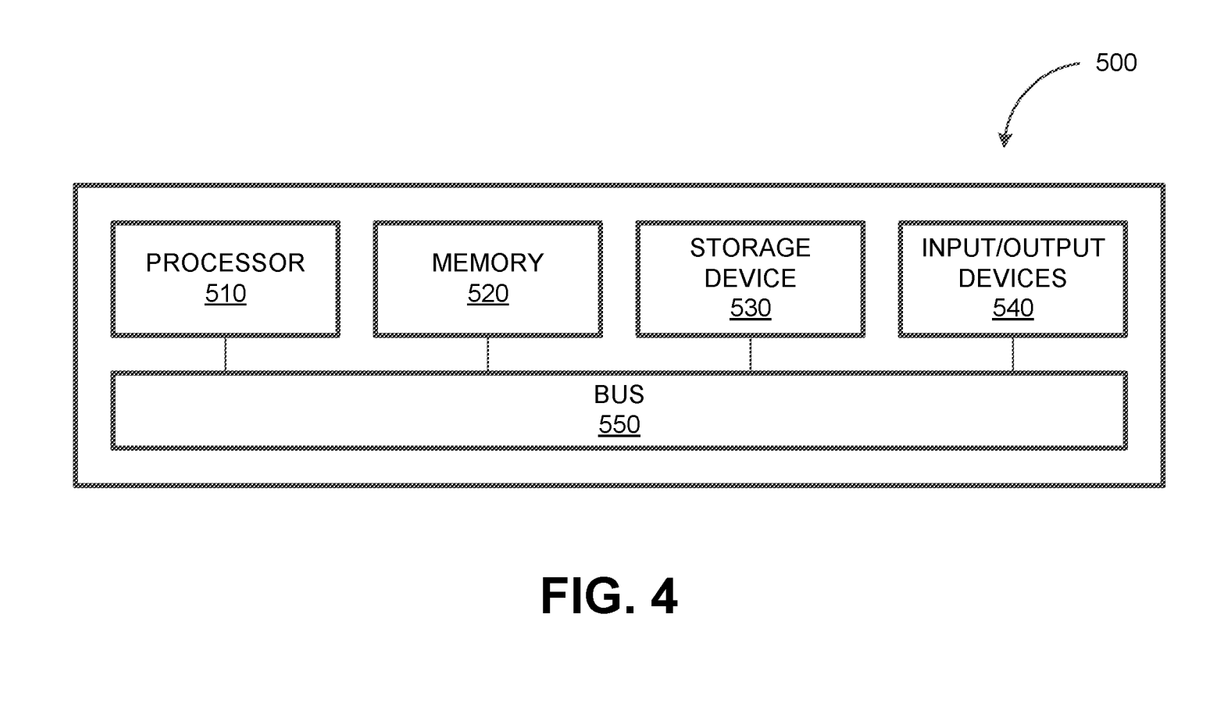
FIG. 4 depicts a block diagram illustrating an example of a computing system, in accordance with some example implementations.

FIG. 4 depicts a block diagram illustrating an example of a computing system 500 consistent with implementations of the current subject matter. Referring to FIGS. 1-4, the computing system 500 may implement the database execution engine 1500 and/or any components therein.

As shown in FIG. 4, the computing system 500 can include a processor 510, a memory 520, a storage device 530, and input/output device 540. The processor 510, the memory 520, the storage device 530, and the input/output device 540 can be interconnected via a system bus 550. The processor 510 is capable of processing instructions for execution within the computing system 500. Such executed instructions can implement one or more components of, for example, the database execution engine 1500. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising: at least one data processor; and at least one memory storing instructions which, when executed by the at least one data processor, cause operations comprising: receiving a query request including a top k query operator for query plan generation, optimization, and execution; generating a query plan that includes at least one pipeline of a plurality of operators, wherein the at least one pipeline is associated with a directed acyclic graph; detecting in the query plan a first operator in the at least one pipeline that causes an early exit; and in response to the early exit by the first operator during query execution, processing back through the directed acyclic graph to identify at least one preceding operator that should or should not run given the early exit of the first operator, wherein the identifying whether the at least one preceding operator should or should not run is based on a state of one or more operators coupled to one or more outgoing links of the at least one preceding operator and a propagation mode assigned to the at least one preceding operator.

Example 2: The system of Example 1, wherein the query request is received at a database execution engine.

Example 3: The system of any of Examples 1-2, wherein the top k query operator limits query results to a value of k query results.

Example 4: The system of any of Examples 1-3, wherein the generating further comprises generating the directed acyclic graph, wherein the directed acyclic graph includes the at least one pipeline of the plurality of operators.

Example 5: The system of any of Examples 1-4, wherein the first operator comprises a limit operator associated with the top k query, wherein the limit operator stops, during query execution of the first operator, processing and performs the early exit in response to k query results being returned from one or more databases.

Example 6: The system of any of Examples 1-5, wherein the generating and the detecting occur during query plan generation for the query request including the top k query operator.

Example 7: The system of any of Examples 1-6, wherein the processing back occurs during query execution of the query plan.

Example 8: The system of any of Examples 1-7 further comprising: in response to the limit operator reaching k query results during the query execution of at least the limit operator, stopping processing of the limit operator to allow the limit operator to early exit; and in response to the early exit by the limit operator, stopping processing of the at least one preceding operator based on the state of one or more operators coupled to the one or more outgoing links of the at least one preceding operator and the propagation mode assigned to the at least one preceding operator.

Example 9: A method, comprising: receiving a query request including a top k query operator for query plan generation, optimization, and execution; generating a query plan that includes at least one pipeline of a plurality of operators, wherein the at least one pipeline is associated with a directed acyclic graph; detecting in the query plan a first operator in the at least one pipeline that causes an early exit; and in response to the early exit by the first operator during query execution, processing back through the directed acyclic graph to identify at least one preceding operator that should or should not run given the early exit of the first operator, wherein the identifying whether the at least one preceding operator should or should not run is based on a state of one or more operators coupled to one or more outgoing links of the at least one preceding operator and a propagation mode assigned to the at least one preceding operator.

Example 10: The method of Example 9, wherein the query request is received at a database execution engine.

Example 11: The method of any of Examples 9-10, wherein the top k query operator limits query results to a value of k query results.

Example 12: The method of any of Examples 9-11, wherein the generating further comprises generating the directed acyclic graph, wherein the directed acyclic graph includes the at least one pipeline of the plurality of operators.

Example 13: The method of any of Examples 9-12, wherein the first operator comprises a limit operator associated with the top k query, wherein the limit operator stops, during query execution of the first operator, processing and performs the early exit in response to k query results being returned from one or more databases.

Example 14: The method of any of Examples 9-13, wherein the generating and the detecting occur during query plan generation for the query request including the top k query operator.

Example 15: The method of any of Examples 9-14, wherein the processing back occurs during query execution of the query plan.

Example 16: The method of any of Examples 9-15 further comprising: in response to the limit operator reaching k query results during the query execution of at least the limit operator, stopping processing of the limit operator to allow the limit operator to early exit; and in response to the early exit by the limit operator, stopping processing of the at least one preceding operator based on the state of one or more operators coupled to the one or more outgoing links of the at least one preceding operator and the propagation mode assigned to the at least one preceding operator.

Example 17: A non-transitory computer-readable storage medium including instructions which, when executed by at least one data processor, cause operations comprising: receiving a query request including a top k query operator for query plan generation, optimization, and execution; generating a query plan that includes at least one pipeline of a plurality of operators, wherein the at least one pipeline is associated with a directed acyclic graph; detecting in the query plan a first operator in the at least one pipeline that causes an early exit; and in response to the early exit by the first operator during query execution, processing back through the directed acyclic graph to identify at least one preceding operator that should or should not run given the early exit of the first operator, wherein the identifying whether the at least one preceding operator should or should not run is based on a state of one or more operators coupled to one or more outgoing links of the at least one preceding operator and a propagation mode assigned to the at least one preceding operator.

Example 18: The non-transitory computer-readable storage medium of Example 17, wherein the query request is received at a database execution engine.

Example 19: The non-transitory computer-readable storage medium of any of Examples 17-18, wherein the top k query operator limits query results to a value of k query results.

Example 20: The non-transitory computer-readable storage medium of any of Examples 17-19, wherein the generating further comprises generating the directed acyclic graph, wherein the directed acyclic graph includes the at least one pipeline of the plurality of operators.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, cause operations comprising:
      receiving a query request including a top k query operator for query plan generation, optimization, and execution, wherein the top k query operator limits query results to a value of k query results;
      generating a query plan that includes at least one pipeline of a plurality of operators, wherein the at least one pipeline is associated with a directed acyclic graph;
      detecting in the query plan a limit operator associated with the top k query in the at least one pipeline that causes an early exit in response to k query results being reached, wherein the limit operator is a low-level operator; and
      in response to the early exit, processing back through the directed acyclic graph to identify at least one preceding operator that should or should not run given the early exit of the limit operator associated with the top k query, wherein the identifying whether the at least one preceding operator should or should not run is based on a state of one or more operators coupled to one or more outgoing links of the at least one preceding operator and a propagation mode assigned to the at least one preceding operator that describes a behavior for the at least one preceding operator in response to the early exit, wherein the propagation mode is one of a plurality of predefined propagation modes including a first mode in which the at least one preceding operator is flagged as having seen the early exit when at least one of the one or more operators coupled to one or more outgoing links are also flagged as having seen the early exit, a second mode in which the at least one preceding operator is flagged as having seen the early exit when all of the one or more operators coupled to one or more outgoing links are also flagged as having seen the early exit, and a third mode in which the at least one preceding operator will never be flagged as having seen the early exit.

2. The system of claim 1, wherein the query request is received at a database execution engine.

3. The system of claim 1, wherein the generating further comprises generating the directed acyclic graph, wherein the directed acyclic graph includes the at least one pipeline of the plurality of operators.

4. The system of claim 1, wherein, during query execution, the limit operator associated with the top k query stops processing and performs the early exit in response to k query results being returned from one or more databases.

5. The system of claim 4, wherein the generating and the detecting occur during query plan generation for the query request including the top k query operator.

6. The system of claim 4 further comprising:
in response to the limit operator associated with the top k query reaching k query results during the query execution of at least the limit operator associated with the top k query, stopping processing of the limit operator associated with the top k query to allow the limit operator associated with the top k query to early exit; and
in response to the early exit by the limit operator associated with the top k query, stopping processing of the at least one preceding operator based on the state of one or more operators coupled to the one or more outgoing links of the at least one preceding operator and the propagation mode assigned to the at least one preceding operator.

7. The system of claim 1, wherein the processing back occurs during query execution of the query plan.

8. A method, comprising:
receiving a query request including a top k query operator for query plan generation, optimization, and execution, wherein the top k query operator limits query results to a value of k query results;
generating a query plan that includes at least one pipeline of a plurality of operators, wherein the at least one pipeline is associated with a directed acyclic graph;
detecting in the query plan a limit operator associated with the top k query in the at least one pipeline that causes an early exit in response to k query results being reached, wherein the limit operator is a low-level operator; and
in response to the early exit, processing back through the directed acyclic graph to identify at least one preceding operator that should or should not run given the early exit of the limit operator associated with the top k query, wherein the identifying whether the at least one preceding operator should or should not run is based on a state of one or more operators coupled to one or more outgoing links of the at least one preceding operator and a propagation mode assigned to the at least one preceding operator that describes a behavior for the at least one preceding operator in response to the early exit, wherein the propagation mode is one of a plurality of predefined propagation modes including a first mode in which the at least one preceding operator is flagged as having seen the early exit when at least one of the one or more operators coupled to one or more outgoing links are also flagged as having seen the early exit, a second mode in which the at least one preceding operator is flagged as having seen the early exit when all of the one or more operators coupled to one or more outgoing links are also flagged as having seen the early exit, and a third mode in which the at least one preceding operator will never be flagged as having seen the early exit.

9. The method of claim 8, wherein the query request is received at a database execution engine.

10. The method of claim 8, wherein the generating further comprises generating the directed acyclic graph, wherein the directed acyclic graph includes the at least one pipeline of the plurality of operators.

11. The method of claim 8, wherein the limit operator associated with the top k query stops processing during query execution and performs the early exit in response to k query results being returned from one or more databases.

12. The method of claim 11, wherein the generating and the detecting occur during query plan generation for the query request including the top k query operator.

13. The method of claim 11 further comprising:
in response to the limit operator associated with the top k query reaching k query results during the query execution of at least the limit operator associated with the top k query, stopping processing of the limit operator associated with the top k query to allow the limit operator associated with the top k query to early exit; and
in response to the early exit by the limit operator associated with the top k query, stopping processing of the at least one preceding operator based on the state of one or more operators coupled to the one or more outgoing links of the at least one preceding operator and the propagation mode assigned to the at least one preceding operator.

14. The method of claim 8, wherein the processing back occurs during query execution of the query plan.

15. A non-transitory computer-readable storage medium including instructions which, when executed by at least one data processor, cause operations comprising:
receiving a query request including a top k query operator for query plan generation, optimization, and execution, wherein the top k query operator limits query results to a value of k query results;
generating a query plan that includes at least one pipeline of a plurality of operators, wherein the at least one pipeline is associated with a directed acyclic graph;
detecting in the query plan a limit operator associated with the top k query in the at least one pipeline that causes an early exit in response to k query results being reached, wherein the limit operator is a low-level operator; and
in response to the early exit, processing back through the directed acyclic graph to identify at least one preceding operator that should or should not run given the early exit of the limit operator associated with the top k query, wherein the identifying whether the at least one preceding operator should or should not run is based on a state of one or more operators coupled to one or more outgoing links of the at least one preceding operator and a propagation mode assigned to the at least one preceding operator that describes a behavior for the at least one preceding operator in response to the early exit, wherein the propagation mode is one of a plurality of predefined propagation modes including a first mode in which the at least one preceding operator is flagged as having seen the early exit when at least one of the one or more operators coupled to one or more outgoing links are also flagged as having seen the early exit, a second mode in which the at least one preceding operator is flagged as having seen the early exit when all of the one or more operators coupled to one or more outgoing links are also flagged as having seen the early exit, and a third mode in which the at least one preceding operator will never be flagged as having seen the early exit.

16. The non-transitory computer-readable storage medium of claim 15, wherein the query request is received at a database execution engine.

17. The non-transitory computer-readable storage medium of claim 15, wherein the generating further comprises generating the directed acyclic graph, wherein the directed acyclic graph includes the at least one pipeline of the plurality of operators.

* * * * *